United States Patent
Hagi et al.

(10) Patent No.: US 10,636,545 B2
(45) Date of Patent: Apr. 28, 2020

(54) WIRING HARNESS

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP); TOYOTA JIDOSHA KABUSHIKI KAISHA, Toyota-shi, Aichi (JP)

(72) Inventors: Masahiro Hagi, Mie (JP); Yasushi Atsumi, Mie (JP); Satoshi Sasaki, Mie (JP); Masaharu Suetani, Mie (JP); Satoshi Murao, Mie (JP); Kazuya Fujioka, Mie (JP); Hiroki Kawakami, Okazaki (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-Shi, Osaka (JP); TOYOTA JIDOSHA KABUSHIKI KAISHA, Toyota-Shi, Aichi (JP)

(*) Notice: Subject to any disclaimer, the term of this patent is extended or adjusted under 35 U.S.C. 154(b) by 138 days.

(21) Appl. No.: 15/840,247

(22) Filed: Dec. 13, 2017

(65) Prior Publication Data
US 2018/0174709 A1    Jun. 21, 2018

(30) Foreign Application Priority Data
Dec. 19, 2016   (JP) .................. 2016-245813

(51) Int. Cl.
| | |
|---|---|
| *H01B 7/20* | (2006.01) |
| *H02G 3/04* | (2006.01) |
| *B60R 16/02* | (2006.01) |
| *B60L 15/00* | (2006.01) |
| *H01B 7/00* | (2006.01) |

(52) U.S. Cl.
CPC ............. *H01B 7/20* (2013.01); *B60L 15/00* (2013.01); *B60R 16/0215* (2013.01);
(Continued)

(58) Field of Classification Search
CPC ........................................................ H01B 7/20
See application file for complete search history.

(56) References Cited

U.S. PATENT DOCUMENTS

| | | | |
|---|---|---|---|
| 2014/0216812 A1* | 8/2014 | Adachi | ........... B60R 16/0215 174/72 A |
| 2014/0284100 A1* | 9/2014 | Ichikawa | ........... B60R 16/0215 174/70 R |

(Continued)

FOREIGN PATENT DOCUMENTS

| | | |
|---|---|---|
| CN | 102737773 A | 10/2012 |
| CN | 104718677 A | 6/2015 |
| JP | 2016-063557 A | 4/2016 |

OTHER PUBLICATIONS

Chinese Office Action for Application No. 201711240831.6 dated Mar. 7, 2019; 12 pages.

*Primary Examiner* — Jared Fureman
*Assistant Examiner* — Joel Barnett
(74) *Attorney, Agent, or Firm* — Reising Ethington, P.C.

(57) ABSTRACT

A wiring harness includes an electromagnetic shield and a high-voltage electric wire. The electromagnetic shield includes a metal pipe and a braided member, which is continuous with the metal pipe and includes metal strands. The high-voltage electric wire extends through the metal pipe and the braided member of the electromagnetic shield.

(Continued)

The high-voltage electric wire is electrically connected to an automotive high-voltage battery and includes an insulative coating. The high-voltage electric wire includes a braided protector and a resin protection tube. The braided protector is formed by a braid of insulative reinforced fibers and surrounds the insulative coating. The braided protector of the high-voltage electric wire extends from a portion located inside the metal pipe to a portion surrounded by the braided member. The protection tube of the high-voltage electric wire surrounds a portion of the braided protector located inside the braided member.

5 Claims, 3 Drawing Sheets

(52) U.S. Cl.
CPC ......... *H01B 7/0045* (2013.01); *H02G 3/0468* (2013.01); *B60L 2270/147* (2013.01)

(56) References Cited

U.S. PATENT DOCUMENTS

| | | | |
|---|---|---|---|
| 2015/0170790 A1* | 6/2015 | Guthrie | B60R 16/0215 174/72 A |
| 2015/0287497 A1* | 10/2015 | Shiga | B60R 16/0215 174/84 R |

\* cited by examiner

WIRING HARNESS

CROSS-REFERENCE TO RELATED APPLICATIONS

This application is based upon and claims the benefit of priority from prior Japanese Patent Application No. 2016-245813, filed on Dec. 19, 2016, the entire contents of which are incorporated herein by reference.

BACKGROUND ART

The present disclosure relates to automotive wiring harnesses.

Japanese Laid-Open Patent Publication No. 2016-63557 describes an example in which a vehicle such as a hybrid vehicle or an electric vehicle includes a motor, which serves as a power source that propels the vehicle, an inverter, which is connected to the motor, and a high-voltage battery, which supplies the inverter with power. The inverter and the high-voltage battery are connected by a wiring harness that includes two high-voltage electric wires such as a positive wire and a negative wire.

SUMMARY

In a wiring harness electrically connected to an automotive high-voltage battery such as that described below, the impact of a vehicle collision may short-circuit the two high-voltage electric wires.

It is an object of the present disclosure to provide a wiring harness that obviates short-circuiting of a positive wire and a negative wire electrically connected to an automotive high-voltage battery.

One aspect of the present disclosure is a wiring harness including an elongated tubular electromagnetic shield and a high-voltage electric wire. The electromagnetic shield includes a metal pipe, which forms a portion of the electromagnetic shield in a longitudinal direction of the electromagnetic shield, and a braided member, which is continuous with the metal pipe and forms a further portion of the electromagnetic shield in the longitudinal direction. The braided member includes metal strands. The high-voltage electric wire extends through the metal pipe and the braided member of the electromagnetic shield. The high-voltage electric wire is electrically connected to an automotive high-voltage battery and includes an insulative coating. The high-voltage electric wire includes a braided protector and a resin protection tube. The braided protector is formed by a braid of insulative reinforced fibers. The braided protector is tubular and surrounds an outer circumference of the insulative coating. The braided protector extends from a portion of the high-voltage electric wire located inside the metal pipe to a portion of the high-voltage electric wire surrounded by the braided member. The resin protection tube surrounds an outer circumference of the braided protector at a portion of the high-voltage electric wire located inside the braided member. The protection tube is locally arranged on the high-voltage electric wire in a longitudinal direction of the high-voltage electric wire.

With this structure, the braided protector, which is formed by a braid of insulative reinforced fibers, surrounds the outer circumference of the high-voltage electric wire. This improves the impact resistance of the high-voltage electric wire. As a result, short-circuiting is obviated between a positive wire core and a negative wire core that are electrically connected to the high-voltage battery. Further, the protection tube protects the outer circumference of the braided protector at the portion of the high-voltage electric wire extending through the braided member of the electromagnetic shield where the impact resistance is not as high as the metal pipe. This limits the location where the protection tube is arranged and reduces costs while effectively protecting the high-voltage electric wire with the protection tube.

In some embodiments of the wiring harness, the protection tube of the high-voltage electric wire is located only inside the braided member.

With this structure, the protection tube of the high-voltage electric wire is located only inside the braided member. This further reduces costs.

Some embodiments of the present design obviate short-circuiting of a positive wire and a negative wire electrically connected to an automotive high-voltage battery. Other aspects and advantages of the embodiments will become apparent from the following description, taken in conjunction with the accompanying drawings, illustrating by way of example the principles of the present design.

BRIEF DESCRIPTION OF THE DRAWINGS

The present design, together with objects and advantages thereof, may best be understood by reference to the following description of the presently preferred embodiments together with the accompanying drawings in which.

DESCRIPTION OF THE EMBODIMENTS

Figure 1:
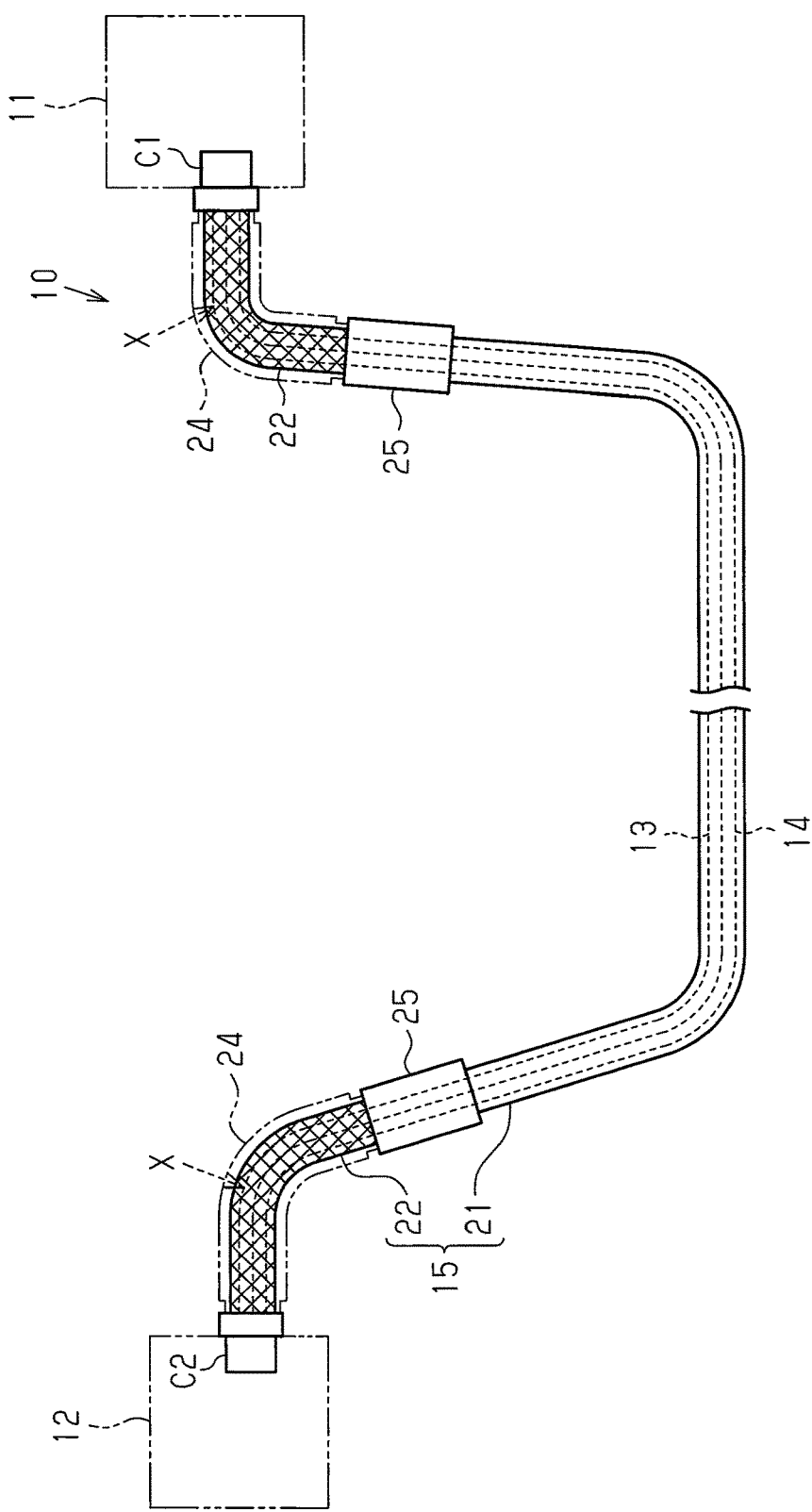
FIG. 1 is a schematic diagram showing one embodiment of a wiring harness.

One embodiment of a wiring harness will now be described with reference to FIGS. 1 to 3. In the drawings, elements are illustrated for simplicity and clarity and have not necessarily been drawn to scale.

As shown in FIG. 1, in a vehicle such as a hybrid vehicle or an electric vehicle, one embodiment of a wiring harness 10 is laid out below a vehicle floor or the like to connect a high-voltage battery 11, which is located, for example, in a rear portion of the vehicle, and an inverter 12, which is located in a front portion of the vehicle. The inverter 12 is connected to a drive wheel motor (not shown) that serves as a vehicle propulsion power source. The inverter generates AC power from the DC power of the high-voltage battery 11 and supplies the motor with the DC power. The high-voltage battery 11 is capable of supplying power of up to hundreds of volts.

The wiring harness 10 includes a positive high-voltage electric wire 13, which is connected to the positive terminal of the high-voltage battery 11, a negative high-voltage electric wire 14, which is connected to the negative terminal of the high-voltage battery 11, and a tubular electromagnetic shield 15, which surrounds the high-voltage electric wires 13 and 14. Each of the two high-voltage electric wires 13 and 14 is a non-shielded wire that is applicable to high voltages and large currents. The two high-voltage electric wires 13 and 14 extend through the electromagnetic shield 15. The two high-voltage electric wires 13 and 14 each include one end connected by a connector C1 to the high-voltage battery 11 and another end connected by a connector C2 to the inverter 12.

The electromagnetic shield 15 as a whole has the form of an elongated tube. The electromagnetic shield 15 includes a metal pipe 21 and braided members 22. The metal pipe 21 may form, for example, the longitudinally intermediate portion of the electromagnetic shield 15. The braided members 22 form, for example, the two ends of the electromagnetic shield 15 and are separate from the metal pipe 21.

The metal pipe 21 is formed from a metal material such as aluminum. The metal pipe 21 is bent into a predetermined shape in accordance with the shape of where the metal pipe 21 is laid out below the vehicle floor. The metal pipe 21 electromagnetically shields both of the high-voltage electric wires 13 and 14, which extend through the metal pipe 21. Further, the metal pipe 21 protects the high-voltage electric wires 13 and 14 from mechanical impacts produced by flying pebbles or the like.

Each braided member 22 is tubular and formed by braid of metal strands. Coupling members 23 (refer to FIG. 2) such as swaging rings respectively connect the braided members 22 to the two longitudinal ends of the metal pipe 21. This electrically connects the braided members 22 and the metal pipe 21. FIG. 2 shows the cross-sectional structure of the metal pipe 21 and the braided member 22 in the wiring harness 10 where the metal pipe 21 is connected to the braided member 22. The outer circumference of each braided member 22 is surrounded by, for example, a sheath 24 such as a corrugated tube. A rubber grommet 25 is attached to where the metal pipe 21 and the braided member 22 are connected to cover the outer circumference of the connected location and keep out water.

Each braided member 22 covers portions of the outer circumferences of both of the high-voltage electric wires 13 and 14 that extend out of the metal pipe 21 (out-of-pipe portion X). This shields the out-of-pipe portion X of the high-voltage electric wires 13 and 14 with each braided member 22.

The structures of the high-voltage electric wires 13 and 14 will now be described.

Figure 2:
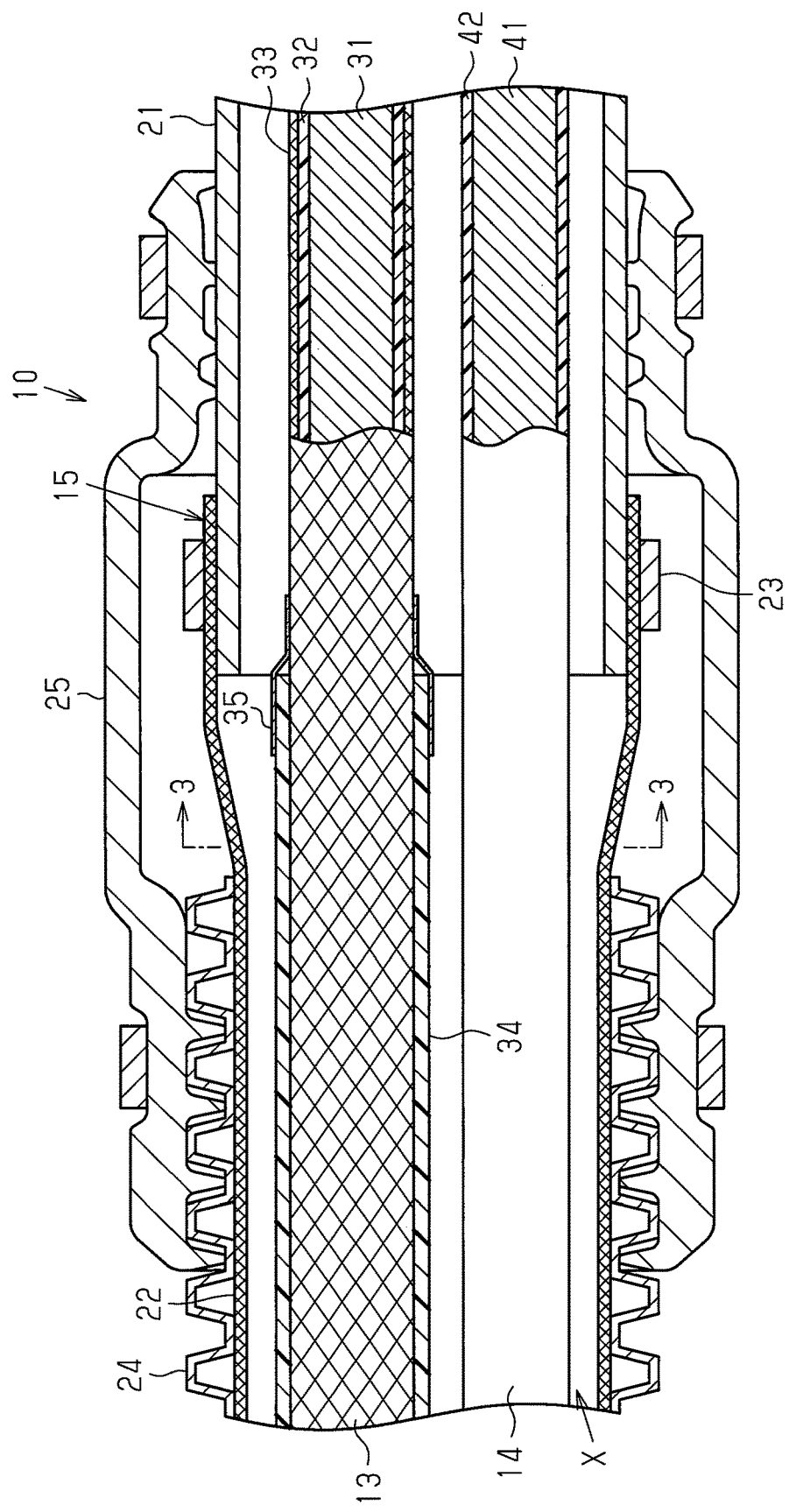
FIG. 2 is a partially, cross-sectional view of the wiring harness shown in FIG. 1.
Figure 3:
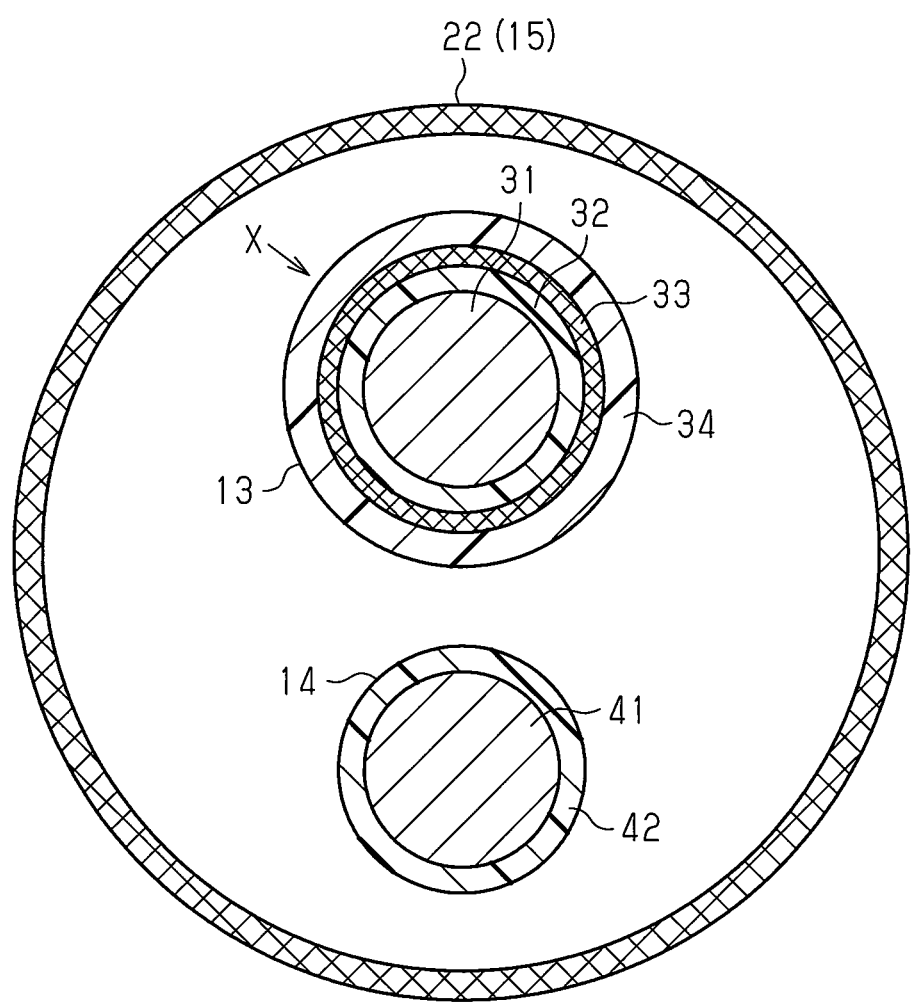
FIG. 3 is a cross-sectional view of the wiring harness taken along line 3-3 in FIG. 2.

Referring to FIGS. 2 and 3, the positive high-voltage electric wire 13 is a coated wire formed by coating a wire core 31, which is formed by a conductor, with an insulative coating 32, which is formed from a resin material. The insulative coating 32 is extruded to cover the outer circumference of the wire core 31 in contact with the outer circumference of the wire core 31.

The positive high-voltage electric wire 13 includes a tubular braided protector 33 that surrounds the outer circumference of the insulative coating 32. The braided protector 33 is flexible and formed by a braid of reinforced fibers having superior insulative characteristics and superior shearing resistance characteristics. The braided protector 33 has a length set so that the braided protector 33 substantially covers the entire length of the insulative coating 32. The two ends of the braided protector 33 are fixed to the insulative coating 32 by an adhesive tape, for example.

Examples of the reinforced fibers that can be used to form the braided protector 33 include para-aramid fibers, polyarylate fibers, poly(para-phenylene-benzobisoxazole) (PBO) fibers, polyethylene terephthalate (PET) fibers, ultra high molecular weight polyethylene fibers, polyetherimide (PEI) fibers, glass fibers, ceramic fibers, and the like. Preferably, one or more types of these fibers are used in accordance with the physical properties required for the braided protector 33. In the present embodiment, the braided protector 33 is formed by one type of reinforced fibers, namely, para-amid fibers.

Further, the positive high-voltage electric wire 13 includes resin protection tubes 34 surrounding the outer circumference of the braided protector 33. The protection tubes 34 are tubular and formed from, for example, a resin material or plastic material such as polyethylene. The protection tubes 34 are locally arranged at two locations in the longitudinal direction of the positive high-voltage electric wire 13. For example, the protection tubes 34 are respectively located in the braided members 22 through which the positive high-voltage electric wire 13 extends. In the present embodiment, one end of each protection tube 34 and one end of the metal pipe 21 are located at the same position in the longitudinal direction. Further, each protection tube 34 has a length that is set so that the protection tube 34 substantially covers the entire length of the out-of-pipe portion X of the positive high-voltage electric wire 13 covered by the corresponding braided member 22. The two ends of the protection tube 34 are fixed to the braided protector 33 by an adhesive tape 35.

The portion of the positive high-voltage electric wire 13 located inside the metal pipe 21 may be referred to as the first length portion. Each portion of the positive high-voltage electric wire 13 located inside one of the braided members 22 but not surrounded by the metal pipe 21 may be referred to as the second length portion. Each protection tube 34 is located in the corresponding second length portion of the positive high-voltage electric wire 13 but not in the first length portion of the positive high-voltage electric wire 13.

In the same manner as the positive high-voltage electric wire 13, the negative high-voltage electric wire 14 includes a wire core 41, which is formed by a conductor, and an insulative coating 42, which is extruded to cover the outer circumference of the wire core 41. The negative high-voltage electric wire 14 does not include the braided protector 33 and the protection tubes 34 that are included in the positive high-voltage electric wire 13. Thus, the structure of the negative high-voltage electric wire 14 is equivalent to the positive high-voltage electric wire 13 less the braided protector 33 and the protection tubes 34.

The operation of the present embodiment will now be described.

The wire core 31 and the insulative coating 32 of the positive high-voltage electric wire 13 are covered by the braided protector 33 that is formed by a braid of reinforced fibers such as para-amid fibers having superior impact resistance (in particular, shearing resistance). Thus, even when, for example, an impact during a vehicle collision damages the metal pipe 21, direct contact of the wire core 31 of the positive high-voltage electric wire 13 with the wire core 41 of the negative high-voltage electric wire 14 will be limited. Further, electric connection of the wire cores 31 and 41 by a broken fragment of the metal pipe 21 or any other vehicle component will be limited. Moreover, the braided protector 33 is insulative. Thus, the braided protector 33 will limit electric connection of the wire core 31 of the positive high-voltage electric wire 13 and the wire core 41 of the negative high-voltage electric wire 14.

The advantages of the present embodiment will now be described.

The tubular braided protector 33, which surrounds the outer circumference of the insulative coating 32 of the high-voltage electric wire 13, is formed by a braid of insulative reinforced fibers. The tubular braided protector 33 extends over the entire high-voltage electric wire 13 from the portion of the high-voltage electric wire 13 in the metal pipe 21 to the portion of the high-voltage electric wire 13 in each braided member 22. As a result, the impact resistance of the high-voltage electric wire 13 is improved. This obviates short-circuiting of the positive and negative wire cores 31 and 41, which are electrically connected to the high-voltage battery 11.

Further, the portion of the high-voltage electric wire 13 in each braided member 22 includes the protection tube 34, which surrounds the outer circumference of the braided protector 33. More specifically, the protection tubes 34 protect the portions of the high-voltage electric wire 13 extending through the braided members 22, which have a lower impact resistance than the metal pipe 21, from the outer side of the braided protector 33. The locations where the protection tubes 34 are arranged on the high-voltage electric wire 13 are limited to reduce the cost of the wiring harness 10 and effectively protect the high-voltage electric wire 13 with the protection tubes 34.

The protection tubes 34 are arranged only on portions of the high-voltage electric wire 13 located in the braided members 22. The braided protector 33 is the outermost layer of the high-voltage electric wire 13 in the metal pipe 21. This structure reduces the cost of the wiring harness 10.

It should be apparent to those skilled in the art that the present invention may be embodied in many other specific forms without departing from the spirit or scope of the invention. Particularly, it should be understood that the present invention may be embodied in the following forms.

In the above embodiment, each protection tube 34 may extend into the metal pipe 21 so that the protection tube 34 is located at the radially inner side of the corresponding end of the metal pipe 21. In this structure, when vibration or the like of the vehicle displaces the positive high-voltage electric wire 13 and causes the high-voltage electric wire 13 to contact the end of the metal pipe 21, the protection tube 34 contacts the metal pipe 21. This limits, for example, entanglement or the like of the braided protector 33 that may occur when the braided protector 33 contacts the metal pipe 21.

In the present embodiment, the braided protector 33 is fixed by an adhesive tape. Instead, the braided protector 33 may be fixed through thermal welding.

The resin material forming the protection tubes 34 is not limited to polyethylene and may be changed when necessary. However, it is preferred that a resin material having superior heat resistance be used.

In the above embodiment, the protection tubes 34 are fixed by the adhesive tape 35 to the braided protector 33. Instead, for example, the protection tubes 34 may be formed by thermal shrinkage tubes. In this case, the thermal shrinkage tube holds the protection tube 34 on the outer circumference of the braided protector 33 with the shrinkage force produced by heat.

In the above embodiment, only the positive high-voltage electric wire 13 includes the braided protector 33 and the protection tubes 34. Instead, the braided protector 33 and the protection tubes 34 may be included in only the negative high-voltage electric wire 14 or both of the high-voltage electric wires 13 and 14. When the high-voltage electric wires 13 and 14 both include the braided protector 33 and the protection tubes 34, the impact resistance of the high-voltage electric wires 13 and 14 can be improved. Consequently, short-circuiting is limited between the wire core 31 of the high-voltage electric wire 13 and the wire core 41 of the high-voltage electric wire 14 in a further suitable manner.

In the wiring harness 10 of the above embodiment, two wires, namely, the positive high-voltage electric wire 13 and the negative high-voltage electric wire 14, extend through the electromagnetic shield 15. However, the wires extending through the electromagnetic shield 15 may be changed in accordance with the structure of the vehicle. For example, instead of or in addition to the wires 13 and 14, low-voltage wires connecting a low-voltage battery and various types of low-voltage devices (e.g., lamps, car audio, etc.) may extend through the electromagnetic shield 15.

The positional relationship of the high-voltage battery 11 and the inverter 12 in the vehicle is not limited to that of the above embodiment and may be changed in accordance with the structure of the vehicle. In the above embodiment, the high-voltage battery 11 is connected by the high-voltage electric wires 13 and 14 to the inverter 12. However, the high-voltage battery 11 may be connected to a high-voltage device other than the inverter 12.

In the above embodiment, the wiring harness 10 connects the high-voltage battery 11 and the inverter 12. However, the wiring harness 10 is not limited to that of the above embodiment and, for example, may be configured to connect the inverter 12 and the wheel drive motor.

The above embodiment and the modified examples may be combined.

The present disclosure encompasses the following implementations. Reference characters are added to the elements to aid understanding and not to impose any limitations.

[Implementation 1] A wiring harness for connecting an automotive high-voltage battery (11) to a non-battery electric device (12), the wiring harness comprising: at least one wire (13, 14); a first connector (C1) and a second connector (C2) arranged on two ends of the at least one wire (13, 14) and respectively connected to the high-voltage battery (11) and the non-battery electric device (12); and a tubular electromagnetic shield (15) continuously extending from the first connector (C1) to the second connector (C2) and including a hollow inner vacant space through which the at least one wire (13, 14) extends, wherein the tubular electromagnetic shield (15) includes a metal pipe (21) and at least one tubular metal braided member (22) adjoined with the metal pipe, the at least one tubular metal braided member (22) terminates at the first connector (C1), the at least one wire (13, 14) includes a first length portion located inside the metal pipe (21), a second length portion located inside the at least one tubular metal braided member (22) but not surrounded by the metal pipe (21), a wire core (31) continuously extending over the first length portion and the second length portion, a braided protector (33) continuously extending over the first length portion and the second length portion, wherein the braided protector (33) protects the wire core (31), and a resin protection tube (34) that contacts an outer surface of the braided protector (33) and covers the braided protector (33), wherein the resin protection tube (34) extends over the second length portion but not over the first length portion of the at least one wire (13,14).

[Implementation 2] The wiring harness (10) according to implementation 1, wherein: the at least one tubular metal braided member (22) includes a first tubular metal braided member that connects the first connector (C1) and the metal pipe (21), and a second tubular metal braided member that connects the second connector (C2) and the metal pipe (21); and the resin protection tube (34) is located inside the first tubular metal braided member and the second tubular metal braided member.

[Implementation 3] The wiring harness (10) according to implementation 1 or 2, wherein the resin protection tube (34) contacts an outer surface of the braided protector (33) and covers the braided protector (33) over a portion of the at least one wire (13, 14) excluding the first length portion, which is surrounded by the metal pipe (21), in an entire length of the at least one wire (13, 14).

[Implementation 4] The wiring harness (10) according to any one of implementations 1-3, wherein the resin protection tube (34) contacts an outer surface of the braided protector (33) and covers the braided protector (33) over a portion of the tubular electromagnetic shield (15) excluding the first length portion, which is surrounded by the metal pipe (21), in an entire length of the tubular electromagnetic shield (15).

It should be apparent to those skilled in the art that the present invention may be embodied in many other specific forms without departing from the spirit or scope of the invention. For example, one or more of the components may be omitted from the components described in the embodiments (or one or more forms of the embodiments). Further, components in different embodiments may be appropriately combined. The scope of the present invention and equivalence of the present invention are to be understood with reference to the appended claims.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

DESCRIPTION OF REFERENCE CHARACTERS 10) wiring harness
11) high-voltage battery
13) positive high-voltage electric wire
14) negative high-voltage electric wire
15) electromagnetic shield
21) metal pipe
22) braided member
32) insulative coating
33) braided protector
34) protection tube

The invention claimed is:

1. A wiring harness comprising:
an elongated tubular electromagnetic shield including a metal pipe, which forms a portion of the electromagnetic shield in a longitudinal direction of the electromagnetic shield, and a braided member, which is continuous with the metal pipe and forms a further portion of the electromagnetic shield in the longitudinal direction, wherein the braided member includes metal strands; and
a high-voltage electric wire extending through the metal pipe and the braided member of the electromagnetic shield, wherein the high-voltage electric wire is electrically connected to an automotive high-voltage battery and includes an insulative coating, wherein the high-voltage electric wire includes:
a braided protector formed by a braid of insulative reinforced fibers, wherein the braided protector is tubular and surrounds an outer circumference of the insulative coating, and the braided protector extends from a portion of the high-voltage electric wire located inside the metal pipe to a portion of the high-voltage electric wire surrounded by the braided member, and
a resin protection tube that surrounds an outer circumference of the braided protector at a portion of the high-voltage electric wire located inside the braided member, wherein the resin protection tube is locally arranged on the high-voltage electric wire in a longitudinal direction of the high-voltage electric wire,
the resin protection tube includes an outer diameter and an inner diameter,
the braided member includes an outer diameter and an inner diameter, the outer diameter of the braided member being greater than the outer diameter of the resin protection tube, and the inner diameter of the braided member being greater than the inner diameter of the resin protection tube.

2. The wiring harness according to claim 1, wherein the resin protection tube of the high-voltage electric wire is located only inside the braided member.

3. The wiring harness according to claim 1, wherein the braided member includes a tubular end that surrounds and comes in contact with an outer circumference of an end of the metal pipe, and wherein the resin protection tube includes a tubular end that surrounds and comes in contact with an outer circumference of the braided member.

4. The wiring harness according to claim 1, wherein the resin protection tube is separate from the braided member and surrounded by the braided member.

5. The wiring harness according to claim 1, wherein the braided member surrounds a plurality of wires including the high-voltage electric wire, and wherein the resin protection tube surrounds only the high-voltage electric wire and not any other wires of the plurality of wires.

* * * * *